United States Patent [19]

Kingsbury

[11] 3,792,471

[45] Feb. 12, 1974

[54] RADAR RANGE LOCK LOOP

[76] Inventor: Keith M. Kingsbury, 2415 N. 38th St., Phoenix, Ariz. 85008

[22] Filed: May 8, 1972

[21] Appl. No.: 251,276

[52] U.S. Cl............ 343/7.3, 343/6.5 R, 343/6.5 LC
[51] Int. Cl............................................... G01s 9/14
[58] Field of Search.... 343/6.5 R, 7.3, 18 E, 6.5 LC

[56] References Cited
UNITED STATES PATENTS

| | | | |
|---|---|---|---|
| 3,328,796 | 6/1967 | Follen et al. | 343/7.3 |
| 3,646,556 | 2/1972 | Bishop | 343/6.5 R |
| 3,566,156 | 2/1971 | Loewer | 343/7.3 |
| 3,360,795 | 12/1967 | Lundgreen et al. | 343/6.5 LC |

*Primary Examiner*—Maynard R. Wilbur
*Assistant Examiner*—G. E. Montone
*Attorney, Agent, or Firm*—Vincent J. Rauner; Victor Myer

[57] ABSTRACT

There is disclosed a radar tracking system wherein a range measurement is obtained by measuring the interval between the transmission of an interrogating pulse and the receipt of a reply pulse from a transponder. A single range gate pulse is generated by analogue means and the range measurement is terminated by the coincident arrival of the leading edge of the first of a coded reply pulse and the range gating voltage pulse at the input of a range lock loop. The range lock loop functions to maintain a predetermined minimum overlap between the leading edge of the reply pulse and the trailing edge of the range gate voltage pulse. A disable signal is applied to the range lock loop after receipt of each pulse that coincides with the range gate pulse. However, to prevent excessive disabling by unsynchronized high pulse repetition frequency interference or jamming pulses, and to allow the loop to remain locked to the desired signal in the presence of this interference, all disable signals are overridden (ignored) for a predetermined time period following receipt of each valid pulse. The range lock loop is re-enabled by sensing the presence of valid pulse information in a memory. The memory is disabled after each sensing of the state of the memory flipflop and is reenabled by the storage in its memory of the next succeeding valid pulse.

14 Claims, 7 Drawing Figures

RADAR RANGE LOCK LOOP

BACKGROUND OF THE INVENTION

In a radar tracking system which requires a read-out of the range to the target and the target is a transponder having a coded reply, range information may be obtained by starting a counter synchronously with the transmission of the radar pulse and stopping the counter with the reception of the reply pulse. To normalize out the error due to the transponder fixed delay in responding, generally on the order of 1 microsecond, the counter starting pulse may be delayed by an equivalent amount.

Since there may be extraneous reply signals, in addition to the desired coded reply, it is desirable to stop the range counter with the output signals of the decoder which receives a coded reply signal thus rejecting the extraneous replies. The time position of the decoder output, however, being coincident with the second pulse in the case where the coded response is a double-pulse reply, generally has a large tolerance with respect to the time position of the first pulse. Such a tolerance would result in an unacceptable range error, thus requiring counter stop pulse to be coincident with the first pulse of the reply. In effect the decoder is bypassed. If the decoder is bypassed in the prior system, any extraneous reply pulse that occurs prior to the valid reply pulse will prematurely stop the counter, resulting in an erroneous range measurement. An additional problem occurs when interference or jamming signals are present. These signals may cause the transponder, against which the radar tracking system is measuring range, to respond. Since the interfering pulse train is now re-transmitted by the systems own transponder, these interfering signals are now properly coded with the double pulse code and can cause erroneous range readouts from the range counter.

Accordingly, it is an object of the invention to provide an improved range lock loop and a radar ranging system utilizing it which will avoid the defects or objections referred to.

Thus the subject invention relates to a range lock loop in which a very narrow range gate, wide enough to encompass only a single reply pulse, is time locked to the first pulse of a valid double pulse reply utilizing only a single range gate. The range lock loop output is a pulse whose leading edge is in time coincidence with the first pulse of the valid reply independent of loop tracking errors. All other extraneous replies are rejected. By utilizing this range lock loop output signal to stop the range counter, accurate range measurements are obtained in the presence of extraneous interfering signals.

In prior circuits for performing a similar function, the reply signal is split into two paths. One of the split input signals or pulses is ANDed with an early gate pulse to form one signal in one path and the second split input signal or pulse is ANDed with a late gate pulse to form a second signal in the second path. The two signals, or pulses, thus derived are subtracted in appropriate circuitry and a control voltage developed therefrom. The circuitry is more complex due to the dual gate requirement and associated additional circuits to disable the sweep (search) mode upon sensing the presence of a signal in the loop. In the subject invention only a single range gate is required. Sweep disable circuits are not required, since the sweep constant current input is utilized to provide out-going tracking in lieu of the second range gate. The range information provided by the leading edge of the loop output pulse is independent of loop tracking errors.

Accordingly, it is a further object of the invention to provide an improved range lock loop of the nature indicated which utilizes a single range gate.

It is a further object of the invention to provide an improved range lock loop of the nature indicated which is accurate in operation, inexpensive to manufacture, and efficient in operation.

It is a further object of the invention to provide an improved range lock loop of the nature indicated which disables its input gate after receiving and accepting a reply pulse in one time frame and re-enables such gate in the immediately subsequent time frame in response to the reception and acceptance of the reply in said one time frame, but that then ignores further disable inputs for a predetermined time following said subsequent time frame.

It is a further object of the invention to provide an improved range lock loop and system of the nature indicated wherein information indicating the receiving and accepting of a valid reply pulse in one time frame, is stored in a memory during that time frame, is read out from the memory during an interrogating period at the beginning of the subsequent time frame and is eliminated from the memory at the end of the interrogating period.

It is a further object of the invention to provide an improved range lock loop in which a secure counter read signal is generated that ignores time frames in which an erroneous range count has been stored in the counter, and causes only valid ranges to be read out even in the presence of high PRF interference.

SUMMARY OF THE INVENTION

In carrying out the invention according to one form there is provided a range indicating system comprising: means for generating and transmitting a series of interrogating pulses having a predetermined repetition rate; means for receiving a series of reply pulses in response to said interrogating pulses, said reply pulses each having leading and trailing edges; means for initiating a range measurement substantially coincident with the transmission of each of said interrogating pulses; means for generating a gating voltage pulse a predetermined time after transmission of each of said interrogating pulses, said gating voltage pulse having a leading edge and a trailing edge; gating means responsive to the coincidence of said gating voltage pulse and the leading edge of each of said reply pulses for terminating said range measurement; and means responsive to variations of the leading edge of each of said reply pulses away from the center of said coincident gating voltage pulses to change said predetermined time for bringing the leading edge of said reply pulses toward the center of said coincident gating voltage pulses.

In carrying out the invention according to a further form there is provided a range indicating system comprising means for generating and transmitting a series of interrogating pulses having a predetermined repetition rate: means for receiving a series of coded first and second reply pulses in response to each of said interrogating pulses; each of said first and second reply pulses having leading and trailing edges; means for initiating a range measurement substantially coincident with the transmission of each of said interrogating pulses; a range lock loop for generating a gating voltage pulse a predetermined time after transmission of each of said interrogating pulses, each of said gating voltage pulses having a leading edge and a trailing edge, and including gating means at the entrance of said loop responsive to the coincidence of said gating voltage pulse and the leading edge of the first one of said reply pulses at said entrance gate for terminating said range measurement, and for determining the time of generation of said gating voltage pulse; decoder means responsive to the receipt of said coincident signals for determining the validity of the coded reply of said coded reply as valid; means for receiving and storing said valid reply; means at said entrance gate for disabling the loop after the receipt of each one of gating pulses and said first one of said reply pulses in coincidence with each other; means for enabling said range lock loop upon the subsequent sensing of the valid pulse in said storage means; means for ignoring subsequent disabling means for a predetermined time following each enabling signal; analogue means responsive to variations between the leading edges of said reply pulses and the trailing edges of the gating pulses for locking the reply pulses to the coincident gating pulses; means responsive to the receipt of a predetermined time interval for energizing read means for reading the range measurement; and means for disabling said read signal unless at least a predetermined number N out of each 20 successive time frames had a valid reply indication from the valid reply memory storage.

DESCRIPTION OF THE PREFERRED EMBODIMENTS

Figure 1:
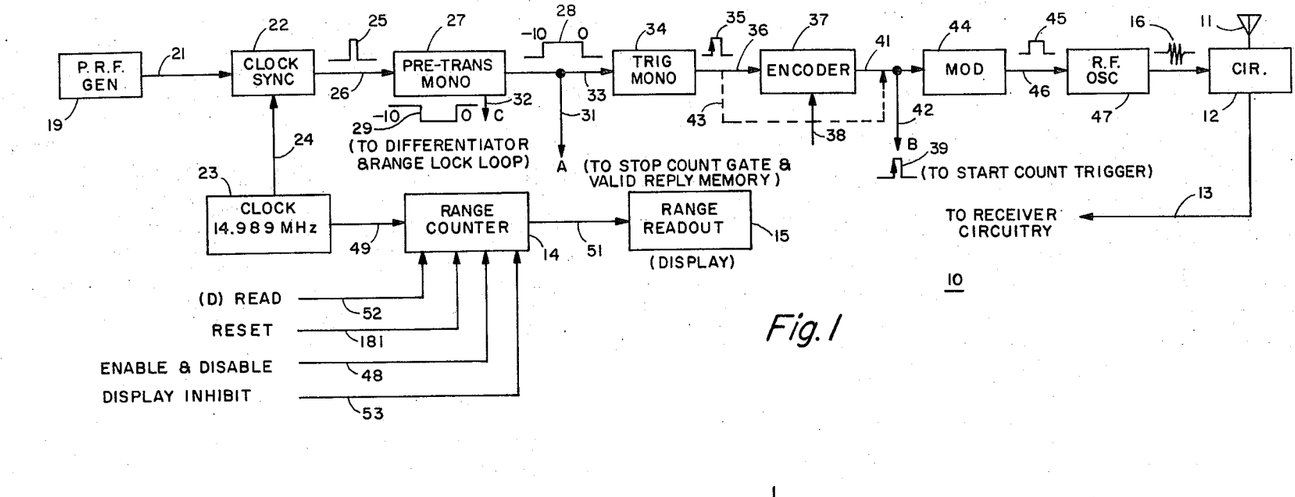
FIG. 1 is a block diagram of a system according to the invention beginning with the generation of an interrogating signal and terminating with the reception and acceptance of a coded reply signal by receiver circuitry.

Referring to the drawings, the overall system of transmitting, receiving and processing radar pulses is illustrated in FIG. 1 by the reference character 10. Transmitting or interrogating pulses are transmitted over an antenna 11 after having been transmitted through a circulator 12, and responding or reply pulses are received over the same antenna 11 and are directed by the circulator 12 to a conductor 13 which takes the responding or reply signal or signals to the receiver circuitry illustrated more particularly on FIGS. 2 and 3. The processing of the received signals from conductor 13 ultimately results in range information being stored in range counter 14 from which the stored information is transmitted to a range read-out or display component 15 as will be more particularly described.

Figure 4:
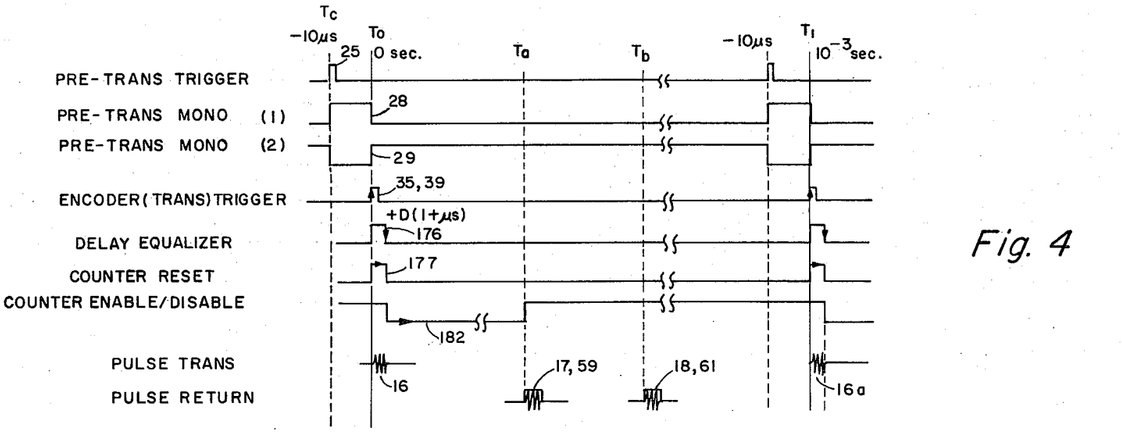
FIG. 4 is a timing diagram useful in explaining the operation of the invention.

Referring briefly to FIG. 4, the transmitted or interrogating signal may be identified by the reference character 16 and is transmitted at some time designated as $T_0$ at 0 seconds. Subsequent to the transmission of the interrogating pulse 16, the transponder or beacon which receives the interrogating pulse transmits reply pulses which are designated by the reference characters 17 and 18. In the particular system referable to FIG. 4, the times of reception of the reply signals at the receiver apparatus are designated as $T_a$ and $T_b$. The transponder or beacon (not shown) generates and retransmits two pulses 17 and 18 coded as to the spacing between them in response to the reception of a single interrogating signal by the transponder. Other arrangements of this nature, of course, may be utilized as will suit the particular circumstances. While not intended to be limiting, the transmitting frequency of apparatus described in the subject application may be in the X band region and specifically may involve frequencies in the area of 9.2 to 9.5 gigahertz (GHz). Other frequencies, of course, may be used. The sequence of operation takes place in repetitive time frames one of which is defined as the time interval between $T_0$ and $T_1$ as shown in FIG. 4. Typically a time frame may be one-thousandth of a second. The latter frequency is designated as the pulse repetition frequency (PRF) and is generated by a PRF generator 19 as shown in FIG. 1.

Thus, referring again to FIG. 4, an interrogating pulse 16 is sent out at time $T_0$. Reply pulses 17 and 18 are received thereafter and a second interrogating pulse 16a is sent out at a time $T_1$, one-thousandth of a second later, this process being repeated regularly at the pulse repetition rate. Prior to the transmission of an interrogating pulse at time $T_0$, $T_1$, etc., a pretransmit trigger pulse 25 is generated at time $T_c$ at 10 microseconds prior to the transmission time ($T_0$), for example. During this 10 microsecond interval $T_c-T_0$, the various other operations such as reading out stored signals, interrogating the memory to determine that previously received pulses are valid, etc., take place.

The transmitting or interrogating sequence begins with the transmission of a pulse by the PRF generator 19 over conductor 21 to a clock synchronizer 22 (FIG. 1). A clock 23 may be of the crystal controlled circuit variety generating a frequency, for example, of 14.989 MHz, which is passed over a conductor 24 to the clock synchronizer 22. The clock synchronizer 22 generates the pretransmit trigger pulse 25 at the pulse repetition frequency rate. The pulse 25 passes over a conductor 26 to a pretransmit monostable circuit 27, the latter being of the multivibrator circuit variety and generates a pretransmit pulse or pulses 28 and 29. These pulses have a 10 microsecond duration, for example, and begin at −10 microseconds ($T_c$), that is to say, 10 microseconds prior to time 0 when a pulse is transmitted over antenna 11. As shown in FIG. 1, pulse 28 goes from a low state or logical 0 to a high state or logical 1, and pulse 29 goes from a high state or logical 1 to a low state or logical 0, these pulses being transmitted over conductors 31, 32, and 33 to other portions of the circuit as will be described. The pretransmit monostable pulse 28 passes over conductor 33 to a trigger monostable pulse circuit 34 which generates a trigger pulse 35 at the trailing edge of time 0 of the pulse 28. The trigger pulse 35 passes over conductor 36 to an encoder circuit 37 in order to generate whatever coded pulses are desired to be transmitted.

The code of the signals generated by encoder 37 may be determined by an input indicated generally by conductor 38. If a single pulse is to be generated by the encoder 37, as, for example, the start count trigger pulse 39 passing over conductors 41 and 42, the encoder may be eliminated as shown, by the dotted line 43. The trigger pulse 39 also passes over conductor 41 to a typical modulator 44 which generates a modulating pulse 45 which passes over conductor 46 to an RF oscillator 47 which may be of the magnetron variety or other suitable variety generating frequencies of the order indicated. The pulse 45 resulting in a high frequency burst of pulses 16 may have a pulse width of approximately 0.3 microseconds, for example. The various components shown in FIG. 1 between the PRF generator 19 and the transmitting antenna 11 may be of well known forms generating the various pulses as described.

Referring briefly to the encoder 37, the setting made by conductor 38 could be such that the encoder generates two or more signals in response to each input signal, or any other combination, including various time spacings between the encoded signals. In the case being described, the transmitting signal generated by the encoder is only a single pulse 39 which ultimately also goes to the range counter 14 for starting the count sequence at the transmission time.

According to the invention, the range information is determined by the time interval between the sending of an interrogating pulse 16 and the receiving of a reply pulse 17. For eliminating errors in tracking, the timing is taken with respect to the reception of the leading edge of the reply pulse.

Referring to FIG. 1, the timing between the transmission and reception of interrogating and reply pulses takes place in range counter 14 which is activated by an appropriate signal 39 coming over conductor 42 (B) entitled "start count trigger," the count being initiated by an enable signal over the conductor 48 from other components to be described.

The range counter 14 may be of any well known variety and stores clock pulses from clock 23 over conductor 49, these pulses being at the rate of 14.989 MHz. When the range information is read out of the counter and into the range read-out or display 15, an appropriate signal is transmitted for this purpose over conductor 51. The read command signal to range counter 14 comes over the conductor 52 (D), FIGS. 1, 2 and 3, and is developed after the reply pulse 17, 59 has been processed through various circuit components as will be described. The range counter 14 is enabled over conductor 48 (FIG. 2) when the interrogating pulse is sent as will be described and is disabled by the receipt of the leading edge of the first reply pulse 17, 59 under appropriate conditions as will also be described. The enable pulse for the range counter is generated following receipt of the signal 39 over conductor 42 from the transmitting sequence of components. The disable signal for the range counter 14 is developed after receipt of the first reply pulse which, of course, comes over conductor 13.

Conductors 31 and 32 extend from the pretransmit monostable 27. The pulse 28 over conductor 31 is utilized to stop the count under certain conditions as will be described and to interrogate a valid reply memory 126 to determine that the pulse received by the circuit is a proper pulse. The pulse 29 over conductor 32 is differentiated to develop a peak pulse for starting the timing operation in the range lock loop 65 as will be more particularly described.

The range information stored in the range counter 14 is not read every time frame, that is, for every interval between $T_0$ and $T_1$ as shown in FIG. 4 because such a rapid read-out would result in a blur because of the rapidly changing information. Accordingly circuitry, subsequently to be described, develops a read signal every three to five seconds in order to develop a visual read-out in a clear fashion. Also under certain circumstances as will be described, the range read-out or display in inhibited so as to avoid the showing of meaningless results such, for example, as transients during start-up, lock-up or charge dumping. Such a display inhibit signal is developed by the circuitry to be described and is transmitted over the conductor 53 to the range counter 14.

Figure 2:
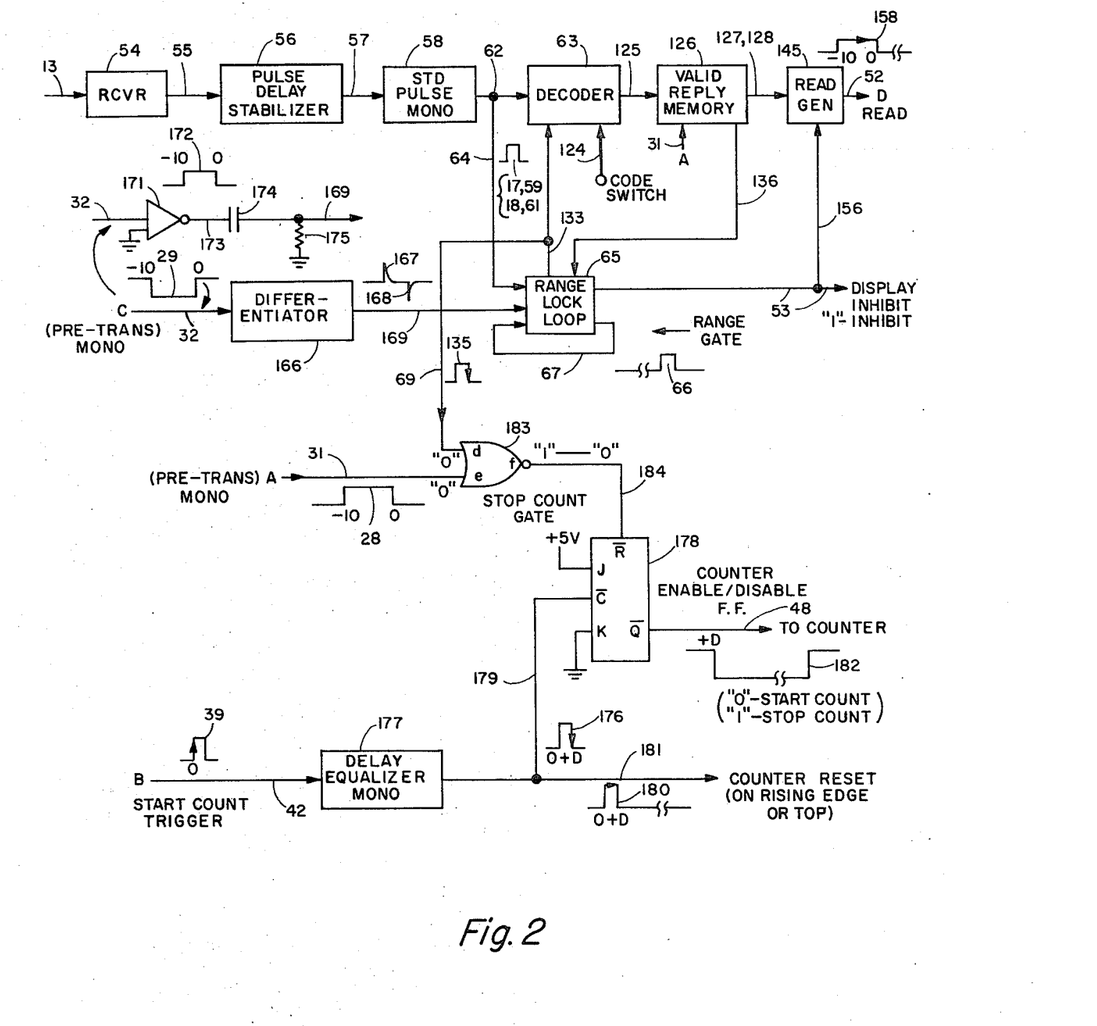
FIG. 2 is a block diagram of a portion of the system according to the invention beginning with the receiver and continuing through certain of the operating components.

When a reply pulse 17 or reply pulses 17 and 18 are received over antenna 11, they are passed through conductor 13 to a receiver 54 which may be of a standard type for demodulating, or detecting, an RF signal to develop a video signal or pulse. Referring to FIG. 2, the video signal or pulse is transmitted over a conductor 55 to a pulse delay stabilizer circuit 56. The latter may be of an ordinary or standard variety to normalize or stabilize the timing of a received pulse in order to aid in the elimination of errors in delay resulting from changes in signal level of the received signal in response to changes in range. For example, the transmitter and receiver may be mounted on a rapidly moving aircraft such as a supersonic airplane or on a missile, for example, either of which may approach the target transponder and in so doing the amplitude, or signal level, of the received signal will increase. One of the objects of the invention is to eliminate errors in delay of the reply signal and one such factor is the relationship which may exist between the delay of a signal and its amplitude. The pulse delay stabilizer 56 performs this function.

From the pulse delay stabilizer, the video pulse passes over a conductor 57 to a standard pulse monostable network 58, which network may be of any well known variety of the multivibrator type which develops a pulse of standard shape for each signal that it receives. The pulses coming from the standard pulse monostable circuit 58 may be the pulses 59 and 61 of FIG. 3 and correspond respectively to pulses 17 and 18 of FIG. 4, these pulses being spaced apart by a code spacing as determined by the setting of a transponder (not shown). The pulses 59 and 61 for example, may be of short duration, for example, three-tenths of a microsecond or thereabouts and pass over a conductor 62 to a decoder 63 and over a conductor 64 to the range lock loop 65.

The range lock loop 65 develops a range gate pulse 66 in response to the transmission of the interrogating pulse 16, as will be described, and feeds back the range gate pulse 66, which is positioned at some point in time, over conductor 67 to the input of the range lock loop and particularly to the input of the gate structure 68 shown dotted in FIG. 3. If the range gate pulse 66 coincides with the receipt of the leading edge of the first reply pulse 59 and if the preceding reply was valid, the range lock loop develops a signal to stop the counters, this being achieved over conductor 69 labeled "to stop count gate." In the event that there is no coincidence between the range gate pulse 66 and the leading edge of the first reply pulse 59, there is no signal for the range lock loop to lock on and the range lock loop begins a slow sweep, as will be described, of the range gate pulse 66 to locate a valid reply signal. The sweep in search of a valid reply signal continues until the maximum range of the circuit is exceeded at which point the sweep stops and a new sweep begins still in search for a valid reply signal. When a valid reply signal appears at the input of the gate structure 68 in coincidence with range gate pulse 66, the search for a valid signal stops and the range lock loop locks on the reply signal and thereafter tracks it, giving during each time frame a stop counter pulse which is determined by the range. If by some circumstances the loop lock is lost, the circuit again begins a sweep in search of a valid signal.

In prior art devices range lock loop circuits utilized two range gates, an early gate and a late gate, in an effort to maintain a lock on the received signal with resultant duplication and complexity of circuitry. Prior art circuitry was digital in nature and therefore even more complex and detailed. According to the invention, a single range gate, for example pulse 66, is developed and is fed back to develop a lock upon the reply signals. Moreover the circuit is analogue in nature. Both of these improvements result in very substantially increased simplicity.

The range gate pulse 66 is very narrow, being only slightly wider than the reply pulse 59, whereby spurious pulses being able to come through the range gate and cause invalid readings is substantially minimized, if not completely eliminated. According to a preferred form of the invention, two pulses 17, 59 and 18, 61 are received from the transponder as a reply in response to each transmission of an interrogating pulse 16. A circuit is provided for remembering whether the reply pulse in the preceding time frame was valid, namely, that the code spacing was correct and the first pulse of the pair arrived at a time that coincided with the range gate pulse. If the preceding pulse was not valid, that is, it did not meet the criteria just enumerated, the received reply pulse is rejected, no range information corresponding to it is stored, and the range lock loop begins a slow sweep in search of a valid signal.

Figure 3:
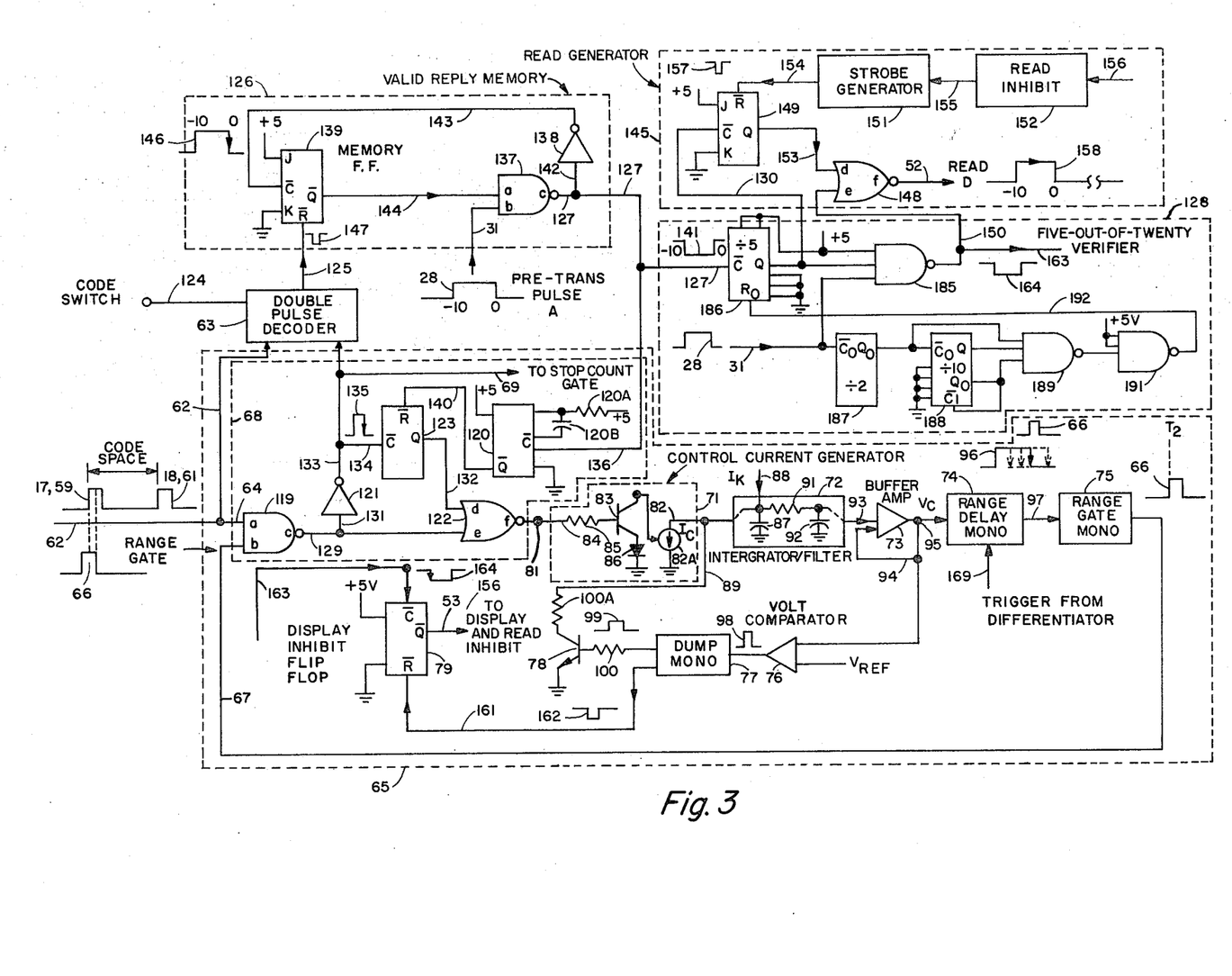
FIG. 3 is a block diagram of the system according to the invention illustrating the operation of the range lock loop and its associated components.

Referring now more particularly to FIG. 3, the range lock loop 65 comprises, in addition to the gate circuitry 68, a control current generator 71, an integrator/filter 72, a buffer amplifier 73, a range delay monostable circuit 74, a range gate monostable circuit 75, a voltage comparator amplifier 76, a dump monostable circuit 77, a dump transistor circuit 78, and a display inhibit flip-flop 79. The components 71 to 79 are essentially well known or standard components and need not be specifically described in detail.

The functioning of the range lock loop 65 may be understood by considering typical operating situations: The first of these being that the circuit is energized and operating but there have been no valid pulses received over conductors 62, 64 for sometime. This, in effect, is case 1 of FIG. 5 wherein the range gate pulse 66 (A = range gate) is shown approaching the target, or reply, pulse 59 (S = input). This is saying that the range gate pulse 66 is occurring earlier in time than that the return of the input signal or reply pulse. The range as measured by the range gate timing is too short. The actual range is longer. Accordingly, the ANDed signal (E = S·A) at the output of gate structure 68, terminal 81, is at a low state or logical 0. Under this condition the control current generator which, for example, may be one or more transistors, would be blocked. That is, there would be no control current $I_c$ flowing therethrough from the conductor 82. A simplified form of the control current generator is shown comprising a single NPN transistor 83, for example, that switches a current 82A source on when a pulse is applied on terminal 81. The terminal 81 is connected by way of conductor 84 through a resistor 85 to the base of the transistor, the emitter thereof being connected through a diode 86 to ground, the collector thereof being connected to the current source 82A, and the output of the current source being connected through conductor 82 to the terminal of a capacitor 87 forming part of the integrator/filter 72.

Figure 6:
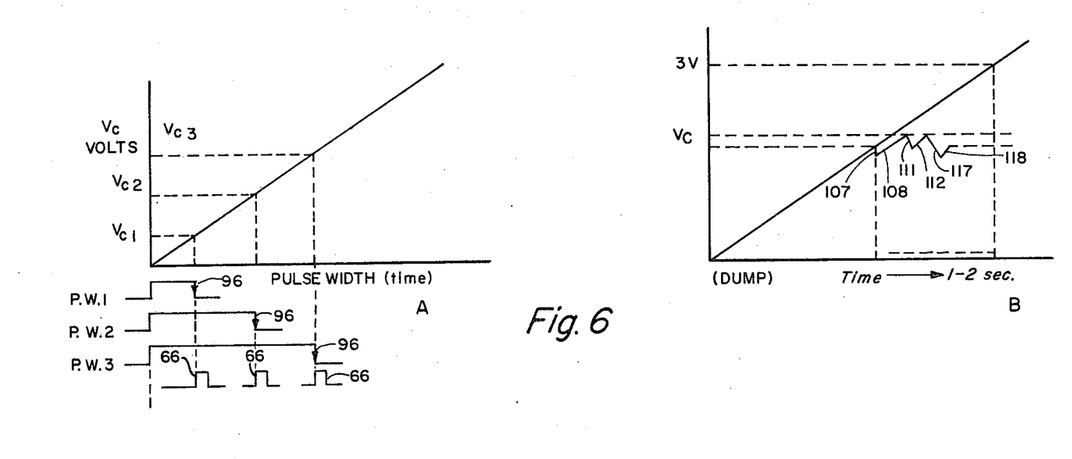
FIG. 6 (A and B) is a pair of graphs illustrating operation of a portion of the range lock loop.

The capacitor 87 is of substantial size, for example 15 microfarads, and has a source of constant current, $I_k$, connected thereto through conductor 88. The transistor 78 under these circumstances is nonconducting and thus the control current $I_c$ through conductors 82 and 89 is 0. Accordingly, the capacitor 87 charges at a constant rate with time as may be seen in FIG. 6B. The capacitor 87 is an integrator with respect to time of the inflow of current $I_k$ at a constant rate thereby giving the voltage $V_c$ across the capacitor. The RC filter comprising resistor 91 and capacitor 92 smooths out any ripples that may exist in the charging current and the output of the integrator/filter appears over conductor 93 as one input to the buffer amplifier 73. The output of the buffer amplifier 73 is fed back through conductor 94 to form the other input of the buffer amplifier thereby giving the output voltage $V_c$ at terminal 95. Under the described conditions, the voltage at terminal 95, $V_c$, increases linearly with time as shown in FIG. 6B.

The range delay monostable 74 is a multivibrator type of circuit which develops a pulse 96 at its output conductor 97, pulse width (time) being proportional to the voltage input, $V_c$. This is shown in FIG. 6A which is a plot of $V_c$ against pulse width. It will be observed that at 0 volts, the pulse width would be 0 and for increasing values of voltage $V_c$, for example $V_{c1}$, $V_{c2}$, and $v_{c3}$, the output pulse widths successively increase as shown by the pulse widths PW1, PW2 and PW3. Monostable circuits of this nature are well known and need not be further described, except to point out that the configuration chosen must be one having linear rather than exponential pulse width versus voltage characteristics. At the trailing edge of each of the pulses PW1, PW2 and PW3, the range gate monostable circuit 75 develops a constant width pulse which is the range gate pulse 66. Thus it will be seen that the range gate pulse 66 is generated at varying times depending upon the value of the input voltage to the range delay monostable 74. This process continues, the width of the pulse $PW_n$ ($n$ time) increasing until a point is reached at which the voltage, $V_c$, is equal to the reference voltage, $V_{Ref}$, of the voltage comparator 76. This point is reached as may be visualized in FIG. 6B when the position of the range gate 66 is beyond the maximum range of the apparatus. This could, for example, be when $V_c$ is equal to 3 volts in a particular case and would occur in a time of 1 to 2 seconds. It will be appreciated that during this 1 to 2 second period, one-thousand to twothousand time frames will have gone by at the described pulse repetition frequency.

When the voltage $V_c$ and $V_{Ref}$ are equal, the voltage comparison amplifier 76 develops a rising pulse 98 which triggers the dump monostable 77 to develop a pulse 99 as shown, the pulse 99 being fed through resistor 100 to the base of dump transistor 78. The pulse 99 turns the transistor on providing a very low resistance circuit therethrough resistor 100A and conductor 89 to the terminal of capacitor 87. The total charge on capacitor 87 is therefore dumped to ground in a very short interval thereby rsulting in the voltage across capacitor 87, and thus the voltage $V_c$, going to 0. This ends one sweep of the range gate. When the transistor 78 turns off the voltage across capacitor 87 begins to build up again and the range gate 66 begins another sweep from 0 time to maximum time.

Referring again to case 1 of FIG. 5, the S or input signal 59 (reply) and the A or range gate signal 66 while apporaching each other have not coincided thereby leaving the output signal at terminal 81 at its low, or off state, i.e., logical 0. The gate structure 68 for this purpose may be considered as an AND gate in that the signal 59 and the range gate signal 66 are ANDed to give an output signal E equal to S·A which is shown as a straight line 101 at 0 level. The average control current (+) is shown by the line 102 adjacent which appears the dotted line labeled "Average Control Current." The $V_c$ filtered control voltage is shown by the arrow 103 rising at a certain rate (maximum) with respect to time. In all cases of FIG. 5, the width of the input or data pulse 59, 17 is shown as $\Delta 1$ having its leading edge at time $T_a$ and the range gate pulse 66 is shown having a width $\Delta 2$ essentially the same as $\Delta 1$ beginning at time $T_d$. In case 1 there is no overlapping between $\Delta 1$ and $\Delta 2$, and thus no control current, $I_c$ flowing out of capacitor 87. But constant charging current $I_k$ is flowing into capacitor 87.

Figure 5:
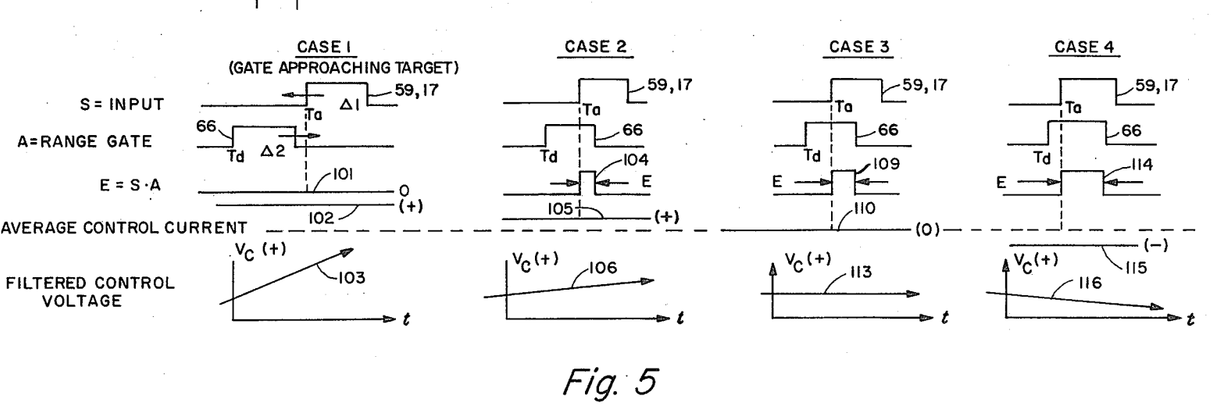
FIG. 5 is a series of graphs illustrating operation of the range lock loop.

The second assumed operating condition of range lock loop 65 is that of case 2 of FIG. 5 wherein the range gate pulse 66 occurs slightly later in time (the range is longer) so that the leading edge of the input or reply pulse 59, 17 overlaps the range gate pulse 66 as seen in FIGS. 3 and 5. In this case, the range lock loop has locked on the reply signal but is not quite at the center or optimum position. During the overlap shown as the ANDed signal S·A pulse 104 equal to E, the signal at terminal 81 (FIG. 3) has a high state, or logical 1 value. For the period of E, the transistor 83 of the control current generator 71 is conducting and a portion $I_c$ of the current $I_k$ flowing into the capacitor 87 flows out through the transistor 83 and the diode 86 to ground. There is an average control current having a plus value as shown in case 2 by line 105 and gives a rising value to the voltage $V_c(t)$, shown by the rising arrow 106 of FIG. 5, the rise being at a lesser rate than for arrow 103. During the overlap 104, the voltage $V_c$ may fall as shown by 107 of FIG. 6B or it may stay constant or rise at a slower rate. When E, 104, terminates, transistor 83 again is nonconducting and capacitor 87 charges at the original rate as shown by 108 of FIG. 6B. The average increase of $V_c$, however, is less. Referring to FIG. 6A, the increase of voltage $V_c$ will increase the pulse width appearing at the output at range delay monostable 74 and accordingly this will shift the range gate pulse 66 to a slightly later time.

This leads to the third assumed condition of case 3 as shown in FIG. 5, wherein the overlap of the signal pulse 59 and the range gate pulse 66 is approximately 50 percent. That is, the output pulse E, 109, appearing at terminal 81 has a slightly greater time duration. The transistor 83 is turned on at the leading edge of pulse 59, 17 and the control current $I_c$ which is diverted from capacitor 87 continues for a longer period of time. The consequent decrease in voltage $V_c$ is shown by 111 in FIG. 6B. At the trailing edge of pulse 109, the transistor 83 is again cut off and the current $I_k$ flows into capacitor 87 and $V_c$ increases as shown by 112. The value of the constant current $I_k$, the magnitude of the capacitor 87, the resistance in the circuit, etc., are so chosen that the current $I_c$ diverted by the control current generator is, in case 3, on the average, equal to the current flowing into capacitor 87 from the constant current source. Accordingly in case 3, the voltage $V_{c(t)}$, 113, is shown constant because the net average control current (110) is equal to 0. Under this condition, the loop is in full range lock and is tracking the signal precisely.

The fourth assumed condition is that of case 4, FIG. 5, wherein the range gate pulse, as shown, has moved farther ahead or delayed in time so that the output pulse E, 114 is greater than 50 percent of the value of either 59 or 66. Under this condition the control current generator diverts a greater proportion of current away from capacitor 87 than the constant current source $I_k$ is putting into it. Accordingly, the average control current 115 is shown negative and the voltage $V_{c(t)}$ is decreasing as shown by the arrow 116 of FIG. 5 and by the reference characters 117 and 118 of FIG. 6B. Again referring to FIG. 6A, it will be noted that when $V_c$ decreases, the pulse width of the range delay monostable decreases and the case approaches that of case 3 where the overlap of the input signal and the gate signal is about 50 percent.

In summary, it can be seen that within the range of $(T_a - \Delta)$ being less than $T_d$, and $T_d$ being less than $T_a$ $(T_a - \Delta) < T_d < T_a)$, the leading edge of the output pulse E is in time coincidence with that of the input signal S, independent of gate position. In this formulae $T_a$ is the time of the leading edge of the pulse 59 and $T_d$ is the time of the leading edge of the pulse 66. Within this range, the pulse width at E is given by PW = $[\Delta - (T_a - T_d)]$.

The ramp/filter circuit 72 comprises the large ramp capacitor 87 into which a constant current $I_k$ flows, followed by an RC filter. In the absence of a valid signal S, $I_k$ charges the capacitor to provide a linear voltage ramp at the buffer amplifier output. Thus, output voltage $V_c$ controls the delay monostable 74 pulse width to sweep the range gate 66 at the entrance to loop 65 linearly from a minimum toward a maximum range delay in search of a valid reply. It will be seen that the range lock loop 65 by generating a single range gate pulse 66 tracks the signal or reply pulse with a consequent large simplification in circuitry. This is further brought out by the fact that the voltage $V_c$ which determines the delay of the range gate is an analogue voltage thereby eliminating the need for large capacity counting digital devices. The current $I_k$, the current $I_c$ and the comparison of voltages at comparator 76 likewise are analogue in nature. Since loop lock occurs when the leading edge of the reply pulse is within the range gate pulse, range tracking is independent of loop tracking errors.

Other components of the apparatus may now be described: The gate structure 68 (FIG. 3) consisting of a NAND gate 119, an inverter 121, a NOR gate 122, loop enable flip-flop 123, and loop enable monostable 120 functions, as will be explained, to stop the count of the range counter 14 (FIG. 1) when a reply signal 59 is received within the range gate pulse 66 and to enable the range lock loop 65 for appropriate reception of a subsequent reply signal provided that the reply signal previous thereto was valid, that is, within the range gate and having the proper code spacing. In the particular case being described two reply pulses are received for each interrogating pulse transmitted. Thus reply pulses 59, 17 and 61, 18 as shown on FIG. 3 with a code spacing as indicated are received for each interrogating pulse 16 (FIG. 4) sent. There is a double pulse decoder 63 provided as shown by the block diagram of FIG. 3 in which the code spacing, and for that matter the number, of code pulses to be received may be set as an input by a code switch (not shown) which input would be provided over conductor 124. The double pulse decoder 63 provides a signal over conductor 125 to the valid reply memory 126 if in fact the preceding reply pulse was valid, that is, properly code spaced and the first pulse within the range gate. The valid reply memory 126 supplies signals over conductor 127 to a "5 out of 20 verifier" 128 which in turn supplies signals to a read generator 145 over a conductor 130. The read generator, in response, generates a signal calling upon the range counter to read out or transfer its range information into the range read-out or display 15 all as will be more particularly described.

Referring to the range gate structure 68 of the range lock loop of FIG. 3, the NAND gate 119 is shown as having input terminals *a* and *b*, and an output terminal *c*, terminal a receiving the reply signals 59 and 61 over conductors 62 and 64, terminal b receiving the range gate pulse 66 over conductor 67 and the output terminal *c* providing its output over conductor 129 to the NOR gate 122 and over conductors 129 and 131 to the input of inverter 121. The truth table of the NAND gate 119 is as follows:

| a | b | c |
|---|---|---|
| 0 | 0 | 1 |
| 0 | 1 | 1 |
| 1 | 0 | 1 |
| 1 | 1 | 0 |

Thus the output signal at terminal *c* will have a high state or logical 1 value at all times except when the inputs at terminals *a* and *b* are both equal to their high state values or logical 1's at which point the output terminal c will have a low value or logical 0. Hence there will be a logical 0 at terminal *c* only when the reply signal and the range gate signal overlap, which is to say, when the leading edge of the first reply pulse 59 overlaps the range gate signal 66 as shown in FIG. 5. The NOR gate 122 has input terminals *d* and *e*, and an output terminal *f*, the input terminal *d* being supplied through conductor 132 from the Q terminal of the J-K flip-flop 123, the input terminal *e* being supplied through conductor 129, and the output terminal *f* being connected to terminal 81 and conductor 84.

The truth table for the NOR gate 122 is as follows:

| d | e | f |
|---|---|---|
| 0 | 0 | 1 |
| 0 | 1 | 0 |
| 1 | 0 | 0 |
| 1 | 1 | 0 |

It will be noted that the NOR gate 122 has a low level or logical 0 output for all inputs to terminals *d* and *e* except when these inputs are both 0. At this point the output terminal *f* will have a high state or logical 1. This logical 1, or high state signal, when it exists at the terminal *f*, corresponds to the output pulses E (reference characters 104, 109 and 114) of FIG. 5 and turns transistor 83 (control current generator 71) on in order to develop the tracking signal or locking signal for the range lock loop 65 as described. One of the conditions necessary to exist in gate structure 68 for the high state or logical 1 signal to exist at terminal 81 is that the reply pulse 59 and the range gate pulse 66 coincide at the terminals *a* and *b* of NAND gate 119. This condition will place a logical 0 or low state at terminal *e* of NOR gate 122. For the signal to be transmitted through the NOR gate 122, a logical 0 or low state signal must exist at terminal *d* and it does so exist when the conductor 132 conducts a 0 signal from terminal Q of flip-flop 123. The latter will occur if, during the operation of the circuit, the valid reply memory circuit 126 has been interrogated and has responded that the previous signal stored therein was valid. Under these conditions the flip-flop 123 occupies a state where the terminal Q has a logical 0 or low state signal on it and therefore at terminal *d* or NOR gate 122.

The signals E (104, 109 and 114) appearing at terminal *c* of NAND gate 119 are inverted by inverter 121 to give a logical 0 or a low state signal on conductor 133, conductor 134 and the $\overline{C}$ terminal of the J-K flip-flop 123. The inverted pulse 135, as shown in FIG. 3, when it goes from its high state to its low state, causes flip-flop 123 to clock thereby changing the output signal on the Q terminal (conductor 132) from a logical 0 or low state to a logical 1 or high state. Thiis of course disables the NOR gate 122 and the output thereof at terminal *f* becomes a logical 0 or low state which turns transistor 83 off. Thus at the end of each pulse occasioned by the coincident arrival of a reply pulse 59 and a range gate pulse 66, the gate structure 68 is turned off and no further pulses, spurious or otherwise, can pass therethrough until the gate is again enabled by appropriate manipulation of flip-flop 123 and monostable 120 which occurs by interrogating the valid reply memory at the beginning of each time frame. In the 10 microsecond interval prior to the beginning of each time frame, an interrogating pulse 28 is transmitted over conductor 31 to the valid reply memory 126. If the preceding pulse was valid, that is to say, it arrived at the range lock loop at the same time as the range gate signal and the spacing between the pulses 59 and 61 was proper as determined by the double pulse decoder 63, then a valid reply signal will occur on conductor 136, 127. This will trigger loop enable monostable 120, whose output will set flip-flop 123 to its state wherein at the Q terminal (conductor 132) the signal will change from a high state or a logical 1 to a low state or logical 0. In this case the gate 68 is again enabled and will accept the next valid pulse, or for that matter, any pulse reply which coincides with the range gate pulse 66 at the input to the range lock loop. If on the other hand the interrogating signal determines that the previous pulse was not valid, the signal on conductor 136 will remain in a disabled state which is to say that the signal at terminal Q of flip-flop 123 will remain a logical 1 or high state. Under these conditions subsequent data pulses or signal reply pulses appearing at the entrance to range lock loop 65 will not be accepted thereby but will be rejected. This will continue until the flip-flop 123 is again enabled by an appropriate signal from the valid reply memory when this memory is interrogated by a pretransmit pulse.

It will be observed that the trailing edge of pulse 135 which corresponds to the trailing edge of the pulses E (104, 109 and 114) disables the gate structure 68 and it cannot be enabled until an appropriate signal is received over conductor 136. In this manner spurious pulses are prevented from being accepted by the range lock loop 65. Of course if the gate structure 68 has been enabled and a spurious pulse corresponding to reply pulse 59 should arrive at the range lock loop at the same time as the range gate signal 66, that single spurious pulse would be accepted by the range lock loop. But the trailing edge of the ANDed spurious signal and range gate signal 66 would of course disable the gate 68 and it could not then be enabled again until a valid pulse comes along subsequently to be stored in the valid reply memory and to be read therefrom in response to interrogation to properly set the flip-flop 123. Thus only a single spurious pulse can be accepted by the range lock loop on any given occasion. No subsequent spurious pulses will be accepted until after the circuit has been enabled as described.

An opposite problem might exist in which the repetition frequency of the spurious pulses is so high that such spurious pulses continually disable flip-flop 123 just as the loop is attempting to establish a lock on the valid reply. In this case, the output on conductor 140 of loop enable flip-flop 120 will go to the low state upon reception of the first valid reply signal on conductor 136, and remain low for a predetermined time period. This low state, applied to the $\bar{R}$ input of flip-flop 123 will overide further disabling due to the spurious signals, allowing the loop to establish lock on the valid reply pulse train. The predetermined time is determined by the values of resistance 120A and capacitor 120B, 15K and 10 $\mu f$ in the particular case, for example, causing a delay of 50 to 100 frames.

The valid reply memory consists of a NAND gate 137, an inverter 138, and a memory flip-flop 139 interconnected as shown. The NAND gate 137 has input terminals $a$ and $b$, and an output terminal $c$ terminating in the conductor 127. The truth table for NAND gate 137 is the same as that for NAND gate 119. Thus the output at terminal $c$ will be a logical 1 or high state for all inputs to $a$ and $b$ except when the inputs $a$ and $b$ are each equal to 1. At this state the output at terminal $c$ will be a logical 0 or low state. This is shown by the pulse 141 which is the response of valid reply memory circuit 126 to the interrogating pulse 28 received over conductor 31 during the pretransmit interval. The output signal from terminal $c$ passes over conductor 127 through conductor 142 to the inverter 138 and from the output of the inverter through conductor 143 to the $\bar{C}$ terminal of the J-K flip-flop 139. The output from the $\bar{Q}$ terminal of the J-K flip-flop 139 passes over conductor 144 to terminal $a$ of the NAND gate 137. The signal coming over conductor 144 is the signal determining, insofar as NAND gate 137 is concerned, whether or not the preceding pulse received by the range lock loop was a valid pulse or not. The J terminal of flip-flop 139 is connected to a source of voltage such, for example, as +5 volts and the K terminal is grounded as shown.

The functioning of the valid reply memory 126 may now be described bearing in mind the condition that, if the valid reply memory 126 has stored therein a signal indicating that the previously received reply pulse was valid, an enabling pulse will be transmitted over conductor 136, 127 to enable the gate structure 68, and read pulses will be transmitted over conductors 127 and 130 to enable the read generator. If on the other hand during the interrogating interval the pulse stored in the valid reply memory indicates that the preceding reply pulse was not valid, then the signal over conductor 136 will not enable the gate structure 68 and there will be no read pulses over conductors 127 and on 130 to the read generator 145. The functioning of the valid reply memory 126 may be best understood by considering FIG. 3 in connection with FIG. 4. It is assumed for this condition that the valid reply memory 126 has stored therein, that is, in memory flip-flop 139, a signal indicating that the reply pulse in the preceding time frame was valid. This means that there exists at the $\bar{Q}$ terminal of memory flip-flop 139, i.e., conductor 144 and the terminal $a$ of NAND gate 137, a logical 1 or high state signal. Then, referring also to FIG. 4, during the pretransmit interval $T_c - T_0$ of 10 microseconds, the pretransmit pulse 28 is received at terminal $b$ of NAND gate 137 through conductor 31. As the leading edge of pulse 28 rises from 0 state to its 1 state, the NAND gate 137 having logical 1's at its terminals $a$ and $b$ produces a logical 0 at its terminal $c$, conductor 127. Accordingly the logical 0 is transmitted over conductor 136 to the $\bar{R}$ terminal of flip-flop 123 (gate structure 68) of range lock loop 65, thereby enabling the gate structure 68 by causing the Q terminal of flip-flop 123 to change from logical 1 to logical 0 which appears at terminal $d$ of NOR gate 122.

At the end of the interrogating interval, that is at time $T_0$ (FIG. 4), the pulse 28 after having passed through NAND gate 137 and inverter 138 becomes the pulse 146 which falls from a logical 1 state to a logical 0 state at the time of the trailing edge of pulses 28 and 141. The trailing edge of pulse 146 at the $\bar{C}$ terminal of memory flip-flop 139 causes the flip-flop to clock to change the $\bar{Q}$ output from logical 1 to logical 0, that is to say, the NAND gate 122 is disabled. This occurs at each interrogating interval, that is, the 10 microsecond interval prior to the transmission of the signal. The disabling of the NAND gate 137 which produces the rising (trailing) edge of pulse 141 does not cause the flip-flop 123 to change state as is well understood and the logical 0 on terminal $d$ or NOR gate 122 remains such. At time $T_a$, that is at the return of the leading edge of the return or reply pulse 17, no change occurs in the condition of the members of the valid reply memory 126. The gate structure 68, however, has been enabled and the data pulse is transmitted provided that the range gate pulse 66 is at the proper point in time which is assumed for this case.

At the time $T_b$ (FIG. 4) which is the leading edge of the second reply pulse 18,61 according to the described structure wherein a double pulse reply is received in response to a single pulse transmitted, a trigger pulse 147 is developed by the double pulse decoder 124 and is transmitted over conductor 125 to the $\bar{R}$ terminal of memory flip-flop 139. The receipt of the trigger pulse 147 causes the memory flip-flop 139 to change its state or reset and therefore at the $\bar{Q}$ terminal, the logical 0 changes to a logical 1 at terminal $a$ of NAND gate 137 indicating that the received pulse was valid provided that the code spacing between pulses 17 and 18 (time interval $T_a - T_b$) was correct. If the time interval between pulses 17 and 18 was not correct, then there will be no trigger pulse 147 from the double pulse decoder and the signal at the $\overline{Q}$ terminal of memory flip-flop 139 will remain a logical 0 or invalid.

In summary it may be stated that at the beginning of the pretransmit or interrogating pulse, the valid reply memory supplies a signal indicating that there is stored a valid or not valid previous reply. If valid, such a signal is transmitted and at the end of the interrogating interval, the valid reply memory turns itself off and waits until the next validation which occurs only if the second reply pulse in the immediate time frame arrives at the proper time at which point the valid reply memory again becomes enabled and will so respond at the next pretransmit interrogation.

The double pulse decoder 124 may now be considered:

It is assumed that the code switch terminal, through conductor 125, has been appropriately set to determine that two pulses are to be received in response to a single transmission pulse and that the spacing between the two reply pulses 59 and 61 is to have a particular predetermined interval. Thus when the first reply 59 is received, it is transmitted over conductor 62 to the double pulse decoder and is stored there. If the reply pulse 59 coincides with the range gate pulse 66, a trigger signal is transmitted through the NAND gate 119 and the inverter 121 over conductor 133 to the double pulse decoder 124 and is stored there to start a timing interval. Then, when the second reply pulse 61 is received at the range lock loop, the pulse is transmitted over conductor 62 to the double pulse decoder and if the code spacing was correct, the trigger pulse 147 is transmitted over conductor 126 to set memory flip-flop 139 to indicate that the pulse received was valid. If the second pulse 61 did not arrive at the proper time, that is not at the code spacing set into the double pulse decoder, no trigger signal 147 will be reproduced and the memory flip-flop will retain its disabled state. The valid reply memory at the next interrogating interval will state that there is no valid reply pulse stored there. The range lock gate will remain disabled and will begin a slow sweep in search of a valid signal as has already been described.

The read generator 145 consists of a NOR gate 148, a read enable J-K flip-flop 149, a strobe generator 151 and a read inhibit structure 152 interconnected as shown. The NOR gate 148 has input terminals $d$ and $e$ connected respectively to conductors 153 and 150, conductor 150 extending from the output terminal of NAND gate 185 of the (5/20) verifier 128 and conductor 153 extending from the Q terminal of the J-K flip-flop 149. The output terminal $f$ of NOR gate 148 extends through conductor 52 to the read input of range counter 14 (FIG. 1) as shown by the reference character D. The J-K flip-flop 149 has its J terminal connected to a source of positive voltage, such for example as 5 volts, and has its K terminal connected to ground as shown. Similarly, the conductor 130 extending the 5/20 verifier 128 is connected to the $\overline{C}$ input terminal of J-K flip-flop 149 and the $\overline{R}$ reset terminal of this same flip-flop is connected by means of conductor 154 to the strobe generator 151, which in turn is connected through conductor 155 to the read inhibit structure 152. The input to the read inhibit structure 152 comes over a conductor 156 which is connected to the $\overline{Q}$ terminal of display inhibit flip-flop 79.

The strobe generator 151 may be a free running oscillator of the unijunction multivibrator type which generates a strobe pulse 157, shown as negative-going, conducted to the $\overline{R}$ terminal of flip-flop 149 over conductor 154. Except during the interrogating interval between $T_d$ and $T_o$, for example, when the pulse 141 is present on conductor 127, the signal at terminal $e$ of gate 148 is a logical 1, this signal going to logical 0 in accordance with the functioning of the 5/20 verifier. During the time frame when the strobe generator 151 has generated a strobe signal 157, which is supplied to the $\overline{R}$ terminal of flip-flop 149, the flip-flop resets and the signal from the Q terminal changes from logical 1 to logical 0 which then appears at terminal $d$ of gate 148. This is the condition which now calls for a read signal to be generated at the beginning of the next time frame. During this next time frame the pulse 141 will occur on conductor 127 and will place a logical 0 on the $\overline{C}$ input of divide-by-five structure 186 of 5/20 verifier 128. If five such logical zeroes have been placed on the $\overline{C}$ input within the last 20 consecutive time frames (as will be subsequently explained) a logical 1 will appear at the Q output by the divide-by-five structure 186. Said logical 1, ANDed with pretransmit pulse 28 at the inputs to NAND gate 183, places a logical 0 on terminal $e$ of gate 148 and, since the signal at terminal $d$ of gate 148 is already a 0, the NOR gate 148 develops a logical 1 output which is the pulse 158. At the end of the pretransmit pulse of 10 microsecond duration, the pulse at terminal $e$ of gate 148 returns from a logical 0 to a logical 1 and the output of the NOR gate 148 changes to a logical 0 again. Simultaneously with the above action, pulse 141 ends and conductor 127 goes to a logical 1 again. At the next negative transition of said pulse 141 (i.e. at the next frame in which a valid signal has been stored in the valid reply memory) said negative transition, being a logical 0 clocks the divide-by-five structure 186 so that its Q output changes from logical 1 to logical 0. Thus as previously explained, no further logical 0 can occur at the e input of gate 148 until another five logical zeroes are placed on ($\div 5$) divide by five $\overline{C}$ input within a 20 frame time period.

The aforementioned logical 0 on the $\div 5$ Q output, being connected through conductor 130 to the $\overline{C}$ input of flip-flop 149, clocks flip-flop 149 so that its Q output, on conductor 153, reverts from the logical 0 to a logical 1. Said logical 1, at the $d$ input to gate 148 prevents said gate 148 from generating any further read pulses 158 until some 3 to 5 seconds later when the strobe generator again generates a negative-going strobe pulse 157. Thus, there is a read pulse 158 at most only once every 3 or 5 seconds to be transmitted over conductor 52 to the range counter 14 (FIG. 1) and the range counter feeds a signal to the range read-out display 15 only once every 3 or 5 seconds. During this 3 to 5 second period, 3,000 to 5,000 pulses have taken place according to the pulse repetition frequency rate. Range measurements are made during each of these pulse repetition periods and the counters are energized and de-energized during each one, but there is no readout of the signal to the range read-out display 15. It will be understood that if the display changed at anything approaching the rate of 1,000 times per second, the change would be such as to give only a blur on any visual indication.

Referring to FIG. 3, the 5 out of 20 verifier 128 consists of a divide-by-20 section including a ÷ 2 (divide by two) structure 187, ÷ 10 (divide by 10) structure 188 and a NAND gate 189 and a 1-out-of 5 section consisting of a ÷ 5 (divide by 5) apparatus 176 and a NAND gate 185. The output of the divide by twenty section is connected through inverting gate 191 and conductor 191 to reset input $R_0$ of divide-by-5 apparatus 186. Since the clock input $\bar{C}$ of the ÷ 20 section is clocked every frame by the negative going edge of pretransmit pulse 28 over conductor 31, it will be clear that once every 20 frames the ÷ 5 output will be reset to the logical 0 state. Thus if less than five valid signal pulses 141 occur in a given 20 frames, no READ pulse 158 will occur. Five or more valid signal pulses must occur. The various components of the 5 out of 20 verifier are well known and need not be further described.

Referring to the display inhibit flip-flop 79 of FIG. 3, it will be noted that the $\bar{R}$ terminal is connected by means of a conductor 161 from the output of the dump monostable 77 and receives a negative-going pulse 162. The $\bar{C}$ terminal of flip-flop 79 is connected by means of a conductor 163 to the output conductor 150 of the 5/20 verifier structure whereby the $\bar{C}$ terminal receives the pulse 164 which appears at terminal 150 of NAND gate 185 as previously described.

The J terminal of flip-flop 79 is connected to a source of positive voltage such, for example, as 5 volts and the K terminal is connected to ground as shown.

Thus, whenever the dump monostable 77 is called upon to dump the charge existing on capacitor 87, such as when no valid reply pulse has been found by the range lock loop within the range limit of the circuit, the $\bar{R}$ terminal receives the negative-going pulse 162 and the $\bar{Q}$ terminal of flip-flop 79 develops a signal changing from logical 0 to logical 1 or high state. The logical 1 signal on conductor 53, 156 inhibits the range readout 15 and also the read inhibit structure 152 so that no range read-outs are obtained during the dumping. It will be understood that during this period, no valid signal could be generated by the apparatus. After the dumping process has passed and the circuit is again generating and sending range interrogating pulses such as pulse 16 (FIG. 4) and the first five valid return pulse pairs 59, 61 have occurred within a 20 frame sequence, the 5/20 verifier develops an output pulse on conductor 150 as previously described, which appears at the $\bar{C}$ terminal of flip-flop 69. This changes the signal on the $\bar{Q}$ terminal from a logical 1 to a logical 0 thereby permitting the display and the strobe generator to again function to give appropriate read-outs. At the same time, the read inhibit structure 152 avoids the generation of transients during the initial lock-up of the reply signal 59 and the range gate signal 62.

The remaining structure and the operation of the circuit according to the invention may now be described. As has been previously described, the range delay monostable circuit 74 (FIG. 3) develops an output pulse 96 whose width depends upon the magnitude of the voltage $V_c$ which appears at terminal 95. $V_c$ is a function of the charge on capacitor 87 which is determined in part by the diversion of current therefrom by the control current generator 71 which is energized for a length of time determined by the overlap of the first reply signal 59 and the range gate signal 66. The pretransmit monostable circuit 27 generates a pretransmit pulse 28 which is operative through the components described to transmit a signal over antenna 11 beginning at time $T_0$. At the same time, the pretransmit monostable circuit 27 generates a negative-going pulse 29 of the same dimensions as the positive-going pulse 28. The negative-going pulse 29 is transmitted over the conductor 32 to the differentiator 166.

The output signal from differentiator 166 consists of a pair of spikes 167 and 168 which are transmitted over the conductor 169 to range lock loop 67. The conductor 169 leads to the range delay monostable circuit as may be seen in FIG. 3. The pulse 29 is inverted by inverter 171 thereby becoming the positive-going pulse 172 having a 10 microsecond duration prior to the time $T_0$. The pulse 172 is applied over conductor 173 to the differentiator 166 comprising capacitor 174 and resistor 175 to ground as shown. The capacitor 174 and resistor 175 are of such values that very sharp and closely-spaced pulses 167 and 168 are generated as is well understood. The positive-going spike pulse 167 is applied over conductor 169 to the range delay monostable circuit (FIG. 3) and initiates the timing of this circuit in accordance with the pulse widths shown in FIG. 6A. From the time determined by the spike pulse 167, the range delay monostable circuit 74 develops a pulse width 96 determined by the magnitude of the voltage $V_c$ at the time of initiation by the spike pulse 167.

The rising pulse 167 is chosen as compared with the falling pulse 168 in order to be certain that the range delay monostable circuit 174 begins the generation of the pulse width at time 0 in order that very short range measurements may be accommodated. The pulse 172 which is merely an inversion of the pulse 29 which also is an inversion of the pulse 28 could have been replaced by the pulse 28 except that it is not desirable to have a single pulse perform too many functions because it would result in overloading of the monostable generating circuit. The trigger monostable circuit 34 generates the trigger pulse 35 which passing through encoder 37 becomes the trigger pulse 39 at conductor 42. As pointed out previously herein, when the transmitted or interrogating pulse is a single pulse, the encoder 37 may be bypassed and the trigger pulses 35 and 39 become in effect the same pulse.

Referring to FIG. 4, the trigger pulse 35, 39 rising or leading edge at time $T_0$, initiates the transmission of an interrogating signal. In transponder cases, as here under consideration, there is a turn-around or delay time in the transponder which may, according to the invention, be slightly greater than 1 microsecond, for example 1.3 microseconds. This time delay interval is referred to as +D in FIG. 4, and results in a pulse 176 which is developed by the delay equalizer monostable 177, FIG. 2. In the circuit according to the invention, the time for an interrogating pulse to travel from the antenna to the transponder, turn-around and return as a reply pulse is measured by the time that the counter 14 is enabled and disabled. The range counter 14 is enabled over conductor 48 from the $\bar{Q}$ terminal of J-K counter enable/disable flip-flop 178 at the falling edge of pulse 176. That is to say, the range counter is started after a short time interval corresponding to the delay or turnaround time in the transponder. The pulse 176 is transmitted to the $\bar{C}$ terminal of flip-flop 178 through conductor 179.

The J terminal of flip-flop 178 is connected to a source of positive voltage such as 5 volts, for example, and the K terminal is connected to ground as shown.

The pulse 180 corresponding in shape to the pulse 176 and having the same time delays involved is transmitted over conductor 181 to the range counter 14 and particularly to the counter reset portion thereof in order to reset the range counter to 0. The resetting of the range counter takes place either on the rising edge of pulse 180 or across the top thereof as shown in FIG. 2 and thus the resetting of the range counter takes place slightly before the falling or trailing edge of pulse 176 which enables the counters to start counting. The counter enable/disable pulse is designated by the reference character 182 in FIGS. 2 and 4, and is transmitted to the range counter 14 over the conductor 48. The pulse 182 has a falling edge at the time +D, that is at the end of the standard delay of the responding transponder. The leading edge goes from logical 1 to logical 0 to start the count in the range counter.

When the transmitted or interrogating pulse returns pulse 17, 59 (FIG. 4) and is received and processed by the various circuits described including the range lock loop 65 (FIG. 3) and if the reply signal has its leading edge coincident with the range gate pulse 66, a stop count pulse 135 is transmitted over conductor 69 as previously described to the d input terminal of stop count (NOR) gate 183. This will result in the appearance of a logical 0 at terminal $\bar{R}$ of the flip-flop 178, the signal coming over conductor 184. The latter signal will result in the output signal at $\bar{Q}$ of flip-flop 178 changing from logical 0 to logical 1, thereby stopping range counter 14. This would occur at the leading edge of the reply pulse 17, 59 (FIG. 4). The range counter 14 being energized from the clock 23 will have stored therein a number of counts corresponding to the elapsed time between the transmission of the interrogating signal and the receipt of the leading edge of the first reply pulse. As has been explained, the read generator 145 develops a signal which would be applied to the range counter and thus to the range read-out display the range corresponding to the time of travel of the interrogating and reply pulses. If the reply pulse 17, 59 does not arrive at the range lock loop 65 in time to coinicide with the range gate pulse 66, the range counter 14 will continue to count until the 10 microsecond delay signal prior to the beginning of the second time frame at time $T_1$. During this 10 microsecond time delay, a pretransmit monostable signal 28 (A) will come over the conductor 31 to the terminal e of the stop count gate 183 and will result in a signal, logical 0 appearing at the $\bar{R}$ terminal and resetting this flip-flop to this initial state. This will of course cause the $\bar{Q}$ terminal to go from logical 0 to logical 1, thus stopping the counter and enabling a new cycle to begin.

The NOR gate 183 has the same truth table as the NOR gate 122 and 148. Thus when both inputs d and e are logical 0's, the output f is a logical 1. For all other combinations of inputs to terminals d and e, the output at terminal f is a logical 0. Except when the reply pulse 17, 59 coincides with the range gate pulse 66, the signal on conductor 69 and thus terminal d or NOR gate 183 is a logical 0. Also, except during the pretransmit interval of 10 microseconds, the signal on conductor 31, that is terminal e of NOR gate 183, is a logical 0. Accordingly the normal output signal f on conductor 184 of NOR gate 183 is a logical 1 which appears at the terminal $\bar{R}$ of counter enable/disable flip-flop 178. If the reply pulse 17, 59 coincides with the range gate pulse 66, the signal on conductor 69, terminal e of NOR gate 183, changes to a logical 1, and the signal on the output terminal f becomes a logical 0. This is the condition for turning off the counters because the leading edge of the reply pulse coincides with the range gate.

Once the range lock loop has achieved lock, it will not lose lock by the missing of one or two or even more return pulses. The constants of the circuit have been selected to achieve this end. Thus looking at FIG. 5, it will be appreciated that several time frames of one-thousandth of a second each in duration may pass before the range gate pulse 66 has moved beyond the time position of the input pulse 17, 59 on the assumption that no input pulses have been received. During the lack of reception of input pulses, the range gate pulse 66 continues to sweep toward the right and when beyond the input pulses lock is broken and the range gate pulse sweeps to its maximum range and then begins a new sweep at zero time.

As has been described, the time interval between the transmission of an interrogating pulse and the arrival of a reply pulse has been achieved by the use of a single range gate of very narrow time span, for example, only slightly greater than the time span of the interrogating signal itself which, according to one form of the invention, could be about 0.3 of a microsecond. Spurious pulses could enter the range gate only if arriving at the same time as the coincidence of the range gate pulse and the reply pulse. The coding of the reply pulses requiring two pulses with a definite code spacing between them, and having the range gate disabled unless the previous pulse was valid, spurious pulses are virtually completely eliminated. The timing of the range gate is achieved by analogue means.

What is claimed is:

1. A search and track range indicating system wherein interrogating pulses are transmitted and transponders receiving such interrogating pulses transmit coded reply pulses comprising:

a means for generating and transmitting a series of interrogating pulses having a predetermined repetition rate;

means for receiving a series of coded reply pulses from one of such transponders in response to said interrogating pulses, said reply pulses each having leading and trailing edges;

means for initiating a range measurement substantially coincidently with the transmission of each of said interrogating pulses;

sensing means effective at the time of said range measurement initiation for generating a gating voltage pulse a predetermined time after transmission of each of said interrogating pulses, said gating voltage pulse having a leading edge and a trailing edge;

gating means responsive to the coincidence of said gating voltage pulses and the leading edge of the first of each one of said coded reply pulses for generating a stop pulse;

means responsive to said stop pulse for terminating said range measurement; and     means responsive to variations of the leading edge of each one of said coded reply pulses away from the center of said coincident gating voltage pulses to change said predetermined time for bringing the leading edge of the first one of each of said coded reply pulses toward the center of said coincident gating voltage pulses.

2. The search and track range indicating system according to claim 1 wherein the means responsive to variations of the leading edges of the first coded reply pulse away from the gating voltage pulse comprises a range lock loop including analogue means responsive to variations between the said leading edges of the reply pulses and the said trailing edges of the coincident gating pulses for locking the said reply pulse to the coincident gate pulse, and said analogue means include a capacitor, a constant current charging circuit for said capacitor, and means for diverting current from said capacitor in response to the said difference between the leading edges of the reply pulses and the trailing edges of the gating pulses.

3. The search and track range indicating system according to claim 2 including means for supplying the voltage on said capacitor to said means for generating a gating pulse voltage for varying the predetermined time thereof for generating said gating pulse voltages.

4. A search and track range indicating system wherein interrogating pulses are transmitted and transponders receiving such interrogating pulses transmit coded reply pulses comprising:

means for generating and transmitting a series of interrogating pulses having a predetermined repetition rate;

means for receiving a series of a coded reply pulses from one of such transponders in response to said interrogating pulses, said reply pulses each having leading and trailing edges;

means for initiating a range measurement substantially coincident with the transmission of each of said interrogating pulses;

a range lock loop including sensing means effective at the time of said range measurement initiation for generating a gating voltage pulse a predetermined time after transmission of each of said interrogating pulses, each of said gating voltage pulses having a leading edge and a trailing edge;

said range lock loop including gating means at the entrance thereof responsive to the coincidence of said gating voltage pulses and the leading edges of the first of each one of said coded reply pulses at said entrance gate for generating a stop pulse, and for determining the time of generation of said gating voltage pulse, and means responsive to said stop pulse for terminating said range measurement.

5. The search and track range indicating system according to claim 4 wherein the range lock loop includes analogue means responsive to variations between the leading edges of the first coded reply pulses and the trailing edges of the gating pulses for locking the first coded reply pulse to the coincident gating pulse, includes means at said entrance for disabling the loop after the receipt of each one said gating voltage pulses and said first coded reply pulses in coincidence with each other, includes means for causing said disabling means to ignore subsequent disabling signals for a predetermined time following each enabling signal, includes means for storing information corresponding to the receipt of a predetermined coded reply pulse, and includes means for enabling said range lock loop upon sensing the storage of said predetermined coded reply pulse.

6. A search and track range indicating system wherein interrogating pulses are transmitted and transponders receiving such interrogating pulses transmit coded reply pulses comprising:

means for generating and transmitting a series of interrogating pulses having a predetermined repetition rate;

means for receiving a series of coded first and second reply pulses from one of such transponders in response to each of said interrogating pulses;

each of said first and second reply pulses having leading and trailing edges;

means for initiating a range measurement substantially coincidently with the transmission of each of said interrogating pulses;

a range lock loop including sensing means effective at the time of said range measurement initiation for generating a gating voltage pulse a predetermined time after transmission of each of said interrogating pulses, each of said gating voltage pulses having a leading edge and a trailing edge, and including gating means at the entrance of said loop responsive to the coincidence of said gating voltage pulse and the leading edges of the first of each one of said coded reply pulses at said entrance gate for generating a stop pulse, and for determining the time of generation of said gating voltage pulse;

means responsive to said stop pulse for terminating said range measurement;

decoder means responsive to the receipt of said coincident signals for determining the validity of the coded reply of said first and second pulses and if valid storing said coded reply as valid;

means for receiving and storing said valid reply;

means at said entrance gate for disabling the loop after the receipt of each one of gating pulses and said first one of said reply pulses in coincidence with each other;

means for enabling said range lock loop upon the subsequent sensing of the valid pulse in said storage means;

analogue means responsive to variations between the leading edges of said reply pulses and the trailing edges of the gating pulses for locking the reply pulse to the coincident gating pulses; and means responsive to a predetermined time interval for energizing means for reading the range information.

7. The search and track range indicating system according to claim 6 wherein said analogue means includes a capacitor, constant current charging circuit for said capacitor and means for diverting current from said capacitor in response to the said variations between the leading edges of the first pulse of said coded reply pulses and the trailing edges of said gating pulses.

8. The search and track range indicating system according to claim 7 including means for supplying the voltage on said capacitor to said means for generating a gating pulse voltage for varying the predetermined time thereof for generating said gating pulse voltages.

9. The search and track range indicating system according to claim 7 including means for dumping the current in said capacitor.

10. The search and track range indicating system according to claim 6 including means for displaying said readings of said range information.

11. The search and track range indicating system according to claim 10, including means for inhibiting the display of range information.

12. The search and track range indicating system according to claim 6 including means for disabling said range reading means unless at least a predetermined number N out of every twenty successive time frames had valid reply indications.

13. The search and track range indicating system according to claim 12 wherein N is equal to five.

14. The search and track range indicating system according to claim 12 including a valid reply memory storage apparatus from which said valid reply indications are taken.

* * * * *

UNITED STATES PATENT OFFICE
CERTIFICATE OF CORRECTION

Patent No. 3,792,471            Dated Feb. 12, 1974

Inventor(s) KEITH M. KINGSBURY

It is certified that error appears in the above-identified patent and that said Letters Patent are hereby corrected as shown below:

On the cover sheet, insert -- [73] Assignee Motorola, Inc., Franklin Park, Illinois, a corporation of Illinois -- .

Signed and sealed this 13th day of August 1974.

(SEAL)
Attest:

McCOY M. GIBSON, JR.　　　　　　　　　　C. MARSHALL DANN
Attesting Officer　　　　　　　　　　　　Commissioner of Patents